US008743953B2

(12) United States Patent
Bekiares et al.

(10) Patent No.: US 8,743,953 B2
(45) Date of Patent: Jun. 3, 2014

(54) METHOD AND APPARATUS FOR ADJUSTING VIDEO COMPRESSION PARAMETERS FOR ENCODING SOURCE VIDEO BASED ON A VIEWER'S ENVIRONMENT

(75) Inventors: Tyrone D. Bekiares, Chicago, IL (US); Allan G. Brown, Oswego, IL (US); Robert J. Novorita, Orland Park, IL (US); Scott J. Pappas, Lake Zurich, IL (US); Steven D. Tine, Buffalo Grove, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 894 days.

(21) Appl. No.: 12/910,728

(22) Filed: Oct. 22, 2010

(65) Prior Publication Data
US 2012/0099641 A1    Apr. 26, 2012

(51) Int. Cl.
*H04N 7/12*      (2006.01)
(52) U.S. Cl.
USPC .................................................. 375/240.02
(58) Field of Classification Search
USPC ........ 375/240, 240.01, 240.02; 348/143, 148; 380/201; 455/445
See application file for complete search history.

(56) References Cited

U.S. PATENT DOCUMENTS

| 2007/0060144 A1* | 3/2007 | Mills et al. ................... 455/445 |
| 2007/0140487 A1* | 6/2007 | Meier et al. .................. 380/201 |
| 2010/0002080 A1* | 1/2010 | Maki ........................... 348/148 |

FOREIGN PATENT DOCUMENTS

| WO | 9841021 A1 | 9/1998 |
| WO | 2007009941 A2 | 1/2007 |

OTHER PUBLICATIONS

PCT International Search Report Dated Jan. 6, 2012.

* cited by examiner

*Primary Examiner* — Allen Wong
(74) *Attorney, Agent, or Firm* — Valerie M. Davis; Kenneth A. Haas

(57) ABSTRACT

A policy enforcement device performs a method for adjusting video compression parameters for encoding source video based on a viewer's environment. The method includes: receiving, from a video receiving device, a video stream identifier indicating a video stream and a source of the video stream, wherein the video receiving device is remote from the source of the video stream; receiving an indication of environmental conditions of a viewer of the video stream using the video receiving device; determining a set of video compression parameters based on the indication of environmental conditions of the viewer; sending the set of video compression parameters to the identified source of the video stream to enable encoding of the video stream to a different compression level.

12 Claims, 3 Drawing Sheets

*FIG. 3*

| GPS | ASSIGNED CAD TYPE | ASSIGNED CAD STATUS | BIT RATE | RESOLUTION | FRAME RATE |
|---|---|---|---|---|---|
| MOVING | | NOT ASSIGNED | 96 kb/s | QVGA | 5 |
| STOPPED | | NOT ASSIGNED | 192 kb/s | VGA | 10 |
| MOVING | BUILDING FIRE | EN ROUTE | 192 kb/s | VGA | 10 |
| STOPPED | BUILDING FIRE | ARRIVED | 768 kb/s | VGA | 30 |

VIEWER ENVIRONMENTAL CONDITIONS — 302
REQUIRED VIDEO COMPRESSION PARAMETERS — 304

306 — GPS
308 — ASSIGNED CAD TYPE
310 — ASSIGNED CAD STATUS
312 — BIT RATE
314 — RESOLUTION
316 — FRAME RATE

300

METHOD AND APPARATUS FOR ADJUSTING VIDEO COMPRESSION PARAMETERS FOR ENCODING SOURCE VIDEO BASED ON A VIEWER'S ENVIRONMENT

TECHNICAL FIELD

The technical field relates generally to video compression and more particularly to a method and apparatus for adjusting video compression parameters for encoding source video based on a viewer's environment.

BACKGROUND

Use of streaming media technology (e.g. video over Internet Protocol (IP) and voice over IP) is growing across all market segments, inclusive of consumer, enterprise, and public safety. There are numerous adjustable parameters which a modern digital video encoder uses to determine a level of overall video compression (characterized by an encoded bit rate and thereby a decoded video quality level) applied to source video, namely: encoded spatial resolution, encoded frame rate, and encoded spatial compression (which is typically a function of the quantization factor applied to transformed spatial data). The amount of throughput or bandwidth required for a given stream is largely a function of the values chosen for these three parameters. Typically, the encoded bit rate of a video stream is constrained by the underlying network connecting the source to the receiver. This is particularly true when that underlying network is wireless in nature.

For consumer applications of video streaming (e.g. video telephony, video-on-demand), it may be acceptable to statically fix the parameters iterated above for a given target bit rate. For a given video application (e.g. video telephony), the "mission" of the user receiving video (e.g. engage in a conversation) is unlikely to change.

Within the context of public safety applications, however, it may be advantageous to dynamically vary video compression parameters dependent on the mission of the user receiving video. For example, a field officer, not currently assigned to an incident, may be routinely monitoring surveillance video from other incidents in progress in the event he or she is later assigned to one of these incidents. The encoded quality of this video is likely to be normally low in such instances to minimize the impact on wireless system resources. This lowered level of quality is perfectly acceptable for the officer's mission immediately at hand: to remain situationally aware. Now assume the officer is assigned, by way of a Computer Aided Dispatch, or CAD system, to one of these incidents; clearly, his mission has significantly changed. Among other objectives realized with this change in the officer's disposition, the assigned officer may need to now perform recognition on one or more objects or persons depicted in the received video. These activities will require a relatively higher level of encoded video quality.

Similarly, a fixed camera may provide surveillance video of the inside of a bank which is presently being robbed. The video stream from the camera may be transmitted to responding officers. While these officers are en route to the bank, there may be little value in transmitting to them a relatively high level of encoded video quality (and consequently a relatively high encoded bit rate) given that they are focused on driving safely and preparing for their response. During their commute, a lowered level of encoded video quality is likely acceptable to provide basic situational awareness while minimizing the impact on wireless system resources. Once the officers arrive on scene and with their vehicles safely parked, it may be advantageous to significantly increase the encoded video quality such that the responding officers can engage in a strategic decision making process based on surveillance video. This activity will require a relatively higher level of encoded video quality.

Thus, there exists a need for a method and apparatus for adjusting video compression parameters for encoding source video based on a viewer's environment or disposition.

BRIEF DESCRIPTION OF THE FIGURES

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

FIG. 3 illustrates a table utilized by a policy enforcement device for facilitating adjusting of video compression parameters for encoding source video based on a viewer's environment.

Figure 1:
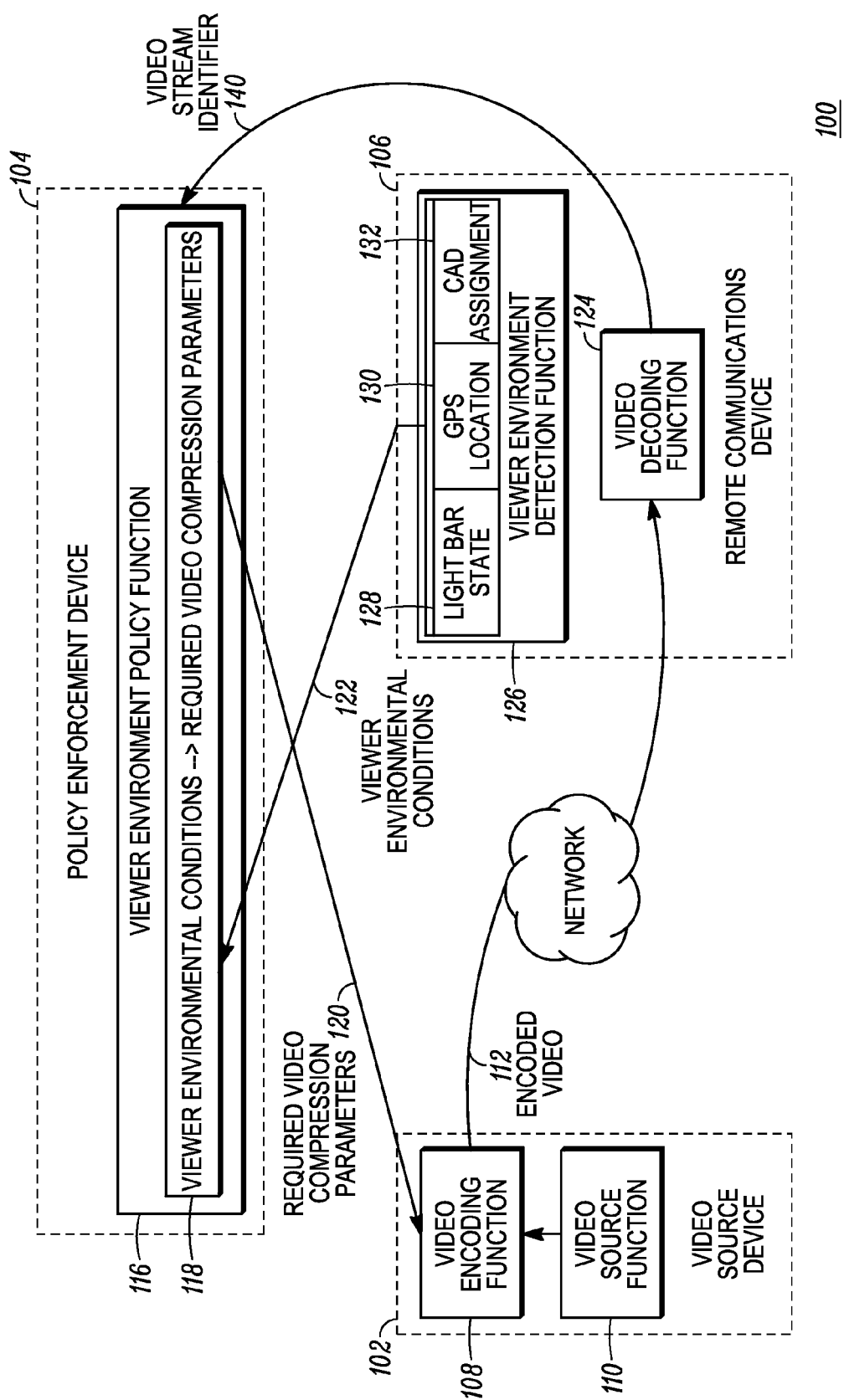
FIG. 1 illustrates a block diagram of a policy enforcement system that implements adjusting of video compression parameters for encoding source video based on a viewer's environment in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required. Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, a policy enforcement device performs a method for adjusting video compression parameters for encoding source video based on a viewer's environment. The method includes: receiving, from a video receiving device, a video stream identifier indicating a video stream and a source of the video stream, wherein the video receiving device is remote from the source of the video stream; receiving an indication of environmental conditions of a viewer of the video stream using the video receiving device; determining a set of video compression parameters based on the indication of environmental conditions of the viewer; sending the set of video compression parameters to the identified source of the video stream to enable encoding of the video stream to a different compression level.

The disclosed embodiments provide a means for automatically and dynamically adjusting video compression parameters for encoding source video, without manual user intervention. This enables a compression level that is constrained by the circumstances and operating environment of the viewer and only uses wireless network resources for transmission of the video as needed instead of always setting the compression level of the encoded video to generate a high decoded video quality (and resulting high use of wireless network resources), even where this level of video quality is not useful to the viewer. These advantages are useful, for instance, in Public Safety scenarios or in any other scenario where there is a need to dynamically adapt the quality of decoded video based on the environment of an intended remote viewer. Those skilled in the art will realize that the above recognized advantages and other advantages described herein are merely illustrative and are not meant to be a complete rendering of all of the advantages of the various embodiments.

Referring now to the drawings, and in particular FIG. 1, a video system that implements adjusting of video compression parameters for encoding source video based on a viewer's environment in accordance with some embodiments is shown and indicated generally at 100. In general, the system 100 includes a video source device 102, a policy enforcement device 104, and a remote communication device 106. The video source device 102 provides encoded video 112 to the remote communication device 106. Encoded video 112 may traverse any number of network and/or server functions and devices which assist in routing encoded video 112 to communication device 106.

The source device 102 includes a video source function 110 and a video encoding function 108. The video source function 110 can be any source (e.g., a camera or file) that provides "uncompressed video", meaning the state of the video as it enters the encoder, which applies spatial and temporal compression; such video in an uncompressed state is described using a bitmap of pixels, and not quantized transforms and motion vectors. "Video", "video sequence", or "video stream", as the terms are used herein interchangeably, mean one or more images comprising a plurality of pixels; wherein the plurality of pixels may be encoded using standard video compression techniques; wherein when there are a plurality of images, the video is, thereby, a sequence of still images with each image in the video sequence being termed a "frame".

The encoding function 108 is illustrated as being physically collocated with the video source function 110 within the same source device 102. However, these two elements can, alternatively, be a part of separate devices. The encoding function 108 (or encoder) uses any suitable algorithm for performing spatial and temporal compression of the pixels in the uncompressed video to generate the encoded video 112. Examples of such encoding algorithms include, but are not limited to, standard video compression technologies like MPEG-2, MPEG-4, H.263, VC-1, VP8, H.264, etc.

Moreover, as stated above, the encoder can impose on the encoded video a particular "compression level" as defined or set by the video compression parameters used to encode the uncompressed video. The video compression parameters are defined as those parameters that affect the bandwidth required to transmit the encoded video 112 over a wireless link, and thereby, the quality of the corresponding decoded video. Generally, the higher the compression level, the smaller the bandwidth needed to transport the encoded video, but the lower the decoded video quality. Conversely, the lower the compression level, the greater the bandwidth needed to transport the encoded video, but the higher the decoded video quality. Video compression parameters can include, but are not limited to, some combination of spatial resolution, frame rate, and spatial compression. In accordance with the teachings herein, the compression level of the encoded video 112 is dynamically adjustable based on the video encoding function receiving a revised set 120 of video compression parameters. Skilled artisans will appreciate that multiple sets of differing video compression parameters may equate to the same encoded video bit rate. For a given encoded bit rate, certain viewer environmental conditions may dictate the use of video compression parameters which favor temporal quality, for example, while others viewer environmental conditions may dictate the use of video compression parameters which favor spatial quality.

The policy enforcement device 104 can be an infrastructure device (e.g., such as a Computer Aider Dispatch (CAD) server) in a network such as a Public Safety network. The policy enforcement device 104 includes a viewer environment policy function 116 that operates in accordance with the present teachings, as described below by reference to FIGS. 2 and 3. The viewer environment policy function 116 could, alternatively, be included in, for example, the video source device 102, or the remote communication device 106, or an infrastructure entity that assists in the establishment of video sessions between the video source device 102 and the remote communication device 106.

The remote communication device 106 is "remote" in that it is physically separated from the video source device 102 by a network that relays the video to the remote communication device 106, in this case, by means of a wireless network 142 providing some limited amount of bandwidth available to one or more remote communication devices 106. The remote communication device 106 can be any mobile or fixed device, for example, such as a cellular phone, a personal digital assistant (PDA), a smart phone, a laptop computer, a desktop computer, or a two-way radio. The remote communication device 106 includes a video decoding function 124, and a viewer environment detection function 126. In other implementations, one or more viewer environment detection functions 126 could also be included in, for example, other devices or applications privy to the environmental conditions of the viewer.

The video decoding function 124 (decoder) receives the encoded video 112 and generates decoded video therefrom for an intended viewer using the communication device 106, which has a decoded video quality that depends on the video compression parameters used to encode the video. The viewer environment detection function 126 receives input from sensors or other input sources including, but not limited to, an emergency light bar 128 on the viewer's vehicle, a Global Positioning System (GPS) 130 that determines a location of the viewer and the viewer's vehicle (also referred to herein as a location status), and CAD assignment 132 that indicates a CAD disposition of the viewer, all of which indicate conditions in the viewer's environment, also referred to herein as environmental conditions. A multitude of environment conditions exist that could be monitored by the viewer environment detection function 126 and are included within the scope of the teachings herein, but which are omitted here for brevity.

The source device 102, the policy enforcement device 104, and the remote communication device 106 each comprise an interface, a programmed processing device, and a memory that are operatively coupled, and which when programmed form the means for these system elements to implement their desired functionality, for example, as illustrated by reference to the functions blocks contained therein and as illustrated by reference to the flow diagram shown in FIG. 2 and the table shown in FIG. 3. Accordingly, functions 108, 110, 116, 118, 124, and 126 are implemented by means of an interface, programmed processing device, and memory operatively coupled for carrying out the functionality of these blocks regardless of where the interface, programmed processing device and memory physically resides.

The implementation of the interface depends on the particular manner in which the elements 102, 104, and 106 are coupled, i.e., wired and/or wirelessly, and/or the manner by which the elements deliver the encoded video 112, video compression parameters 120, and viewer environmental conditions 122 therebetween. For example, where these elements are coupled via a direct wired connection, the interface may comprise a serial port interface (e.g., compliant to the RS-232 standard), a parallel port interface, an Ethernet interface, a USB interface, and/or a FireWire interface, and the like.

Where these elements are coupled via a network that supports wireless communications (for example between the video source device 102 and the remote communication device 106), the interface comprises elements including processing, modulating, and transceiver elements that are operable in accordance with any one or more standard or proprietary wireless interfaces, such as EVDO, WCDMA, LTE, WiMax, WiFi, and the like, wherein some of the functionality of the processing, modulating, and transceiver elements may be performed by means of the processor device through programmed logic such as software applications or firmware stored on the memory.

The processing device being utilized may be programmed with software or firmware logic or code for performing functionality described by reference to FIG. 2 and FIG. 3; and/or the processing device may be implemented in hardware, for example, as a state machine or ASIC (application specific integrated circuit). The memory can include short-term and/or long-term storage of various information needed for the functioning of the respective elements. The memory 116 may further store software or firmware for programming the processing device with the logic or code needed to perform its functionality.

Figure 2:
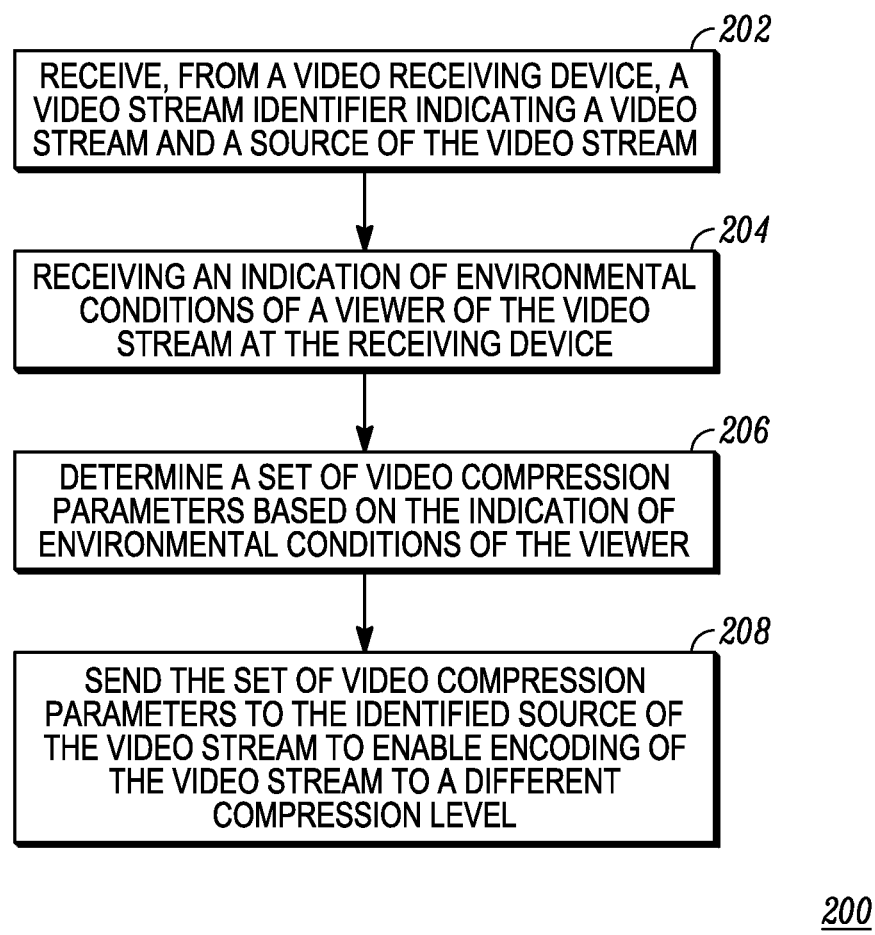
FIG. 2 is a flow diagram illustrating a method for adjusting video compression parameters for encoding source video based on a viewer's environment in accordance with some embodiments.

Turning now to FIG. 2, a method 200 is shown for adjusting video compression parameters for encoding source video based on a viewer's environment, in accordance with some embodiments. Method 200 is performed, for instance, in the policy enforcement device 104. For clarity and ease of illustration, FIG. 2 will be described in conjunction with the elements shown in FIG. 1. However, implementation of method 200 is not, thereby, limited.

In accordance with method 200, the video decoding function 124 of the remote communication device 106 receives an encoded video stream 112 from the video encoding function 108 of the video source device 102. In a typical implementation scenario, the video stream is a live or real-time stream being fed from the video source, often through a relay point in the infrastructure of a wireless network, to an intended remote viewer via the viewer's communication device.

Prior to the establishment of the encoded video stream 112 from the video source 102 to the remote communication device 106, or subsequently after the stream is established, the viewer environment policy function 116 of the policy enforcement device 104 receives (202), from the video decoding function 124 of the remote communication device 106, an identifier 140, having any suitable format, which identifies the video stream 112 and the source of the video stream (in this case video source device 102). This identifier information is later used by the viewer environment policy function 116 to route the selected required video compression parameters to the correct video encoding function.

The video stream 112 may be encoded with an initial set of video compression parameters that may be, for instance, default parameters. However, in accordance with the present teachings, the viewer environment policy function 116 receives (204) an indication of environmental conditions of the remote viewer from the viewer environment detection function 126. By reference to FIG. 1, the "indication" is shown as viewer environment conditions 122, but can be any type of indication (in the form of messages, signaling, packets, datagrams, etc) that serves the purpose of communicating environmental conditions of a remote viewer. As used herein, the term "environmental conditions" of the viewer means any condition that affects or is related to one or more of: a mission or purpose of the remote viewer, a sensor or equipment in the viewer's immediate environment; an incident or event to which the viewer is responding or monitoring or has been assigned (e.g., via a CAD assignment) to respond or monitor, or an incident or event to which the viewer is personally witnessing.

As such, the indication may communicate various data about the state of environment conditions (as experience by the viewer), as collected by the viewer environmental detection function 126. Such conditions may include Emergency Light Bar Activation Status (128) on the viewer's vehicle (which indicates a status of a condition or sensor associated with the viewer's vehicle), GPS speed/location (130) for instance of the viewer or the viewer's vehicle (which indicates a location status), CAD assignment disposition (132), etc. The viewer environment conditions may be generated by a plurality of viewer environmental detection functions, not necessarily collocated with the video decoding function. For example, CAD disposition may be provided to the viewer environment policy function 116 from a CAD server, rather than from the remote communication device 106. Similarly, GPS location may be provided to the viewer environment policy function 116 from an Automated Vehicle Location, or AVL server, rather than from the remote communication device 106.

At 206, the viewer environment policy function 116, uses the indication 122 to determine (206) a set of RequiredVideoQuality video compression parameters (e.g. spatial resolution, bit rate, frame rate, spatial compression) given a set of viewer environmental conditions. These RequiredVideoQuality video compression parameters 120 are transmitted (208) to the Video Encoding Function (known to the viewer environment policy function 116 by way of the video stream and video source identifier 140 transmitted earlier from the video decoding function 124), to enable the encoding of the video stream to a different compression level to better support the conditions of the viewer's environment. This determination may be 1 to 1 (e.g. a given set of environmental parameters corresponds to a given set of RequiredVideoQuality parameters), or it could be many to 1 (e.g. any environmental parameters in a given range correspond to a given set of RequiredVideoQuality parameters). Any algorithm can be used to perform the environmental conditions to video compression parameters mapping, including the use of a mapping table accessible to the viewer environment policy function 116.

With particular respect to the CAD driven workflow of public safety, in general, incidents from routine traffic stops to violent crime are tracked through an agency's CAD system.

Typically, a dispatcher generates a new CAD incident record from a 911 call or from an inbound radio transmission. The status of that record is then updated as necessary by the dispatch operator or the officer assigned (this is typically done through a corresponding Mobile system which communicates with the CAD system). As a traffic stop proceeds from "routine" to "emergency," this state change (for a given incident type) is tracked by the CAD system. This progression of states provides a definitive measure of importance for a given incident, and can, therefore, serve as the basis of an indication 122 to function 116 of the environmental conditions for the viewer. Similarly, where a CAD incident report exists for an incident associated or connected with the viewer (e.g., to which the viewer is responding or called to respond), an indication 122 can identify a change in state or status of the CAD incident record.

Notably, public safety response to a given incident and its associated state is often well dictated. As such, the "mission" of a viewer (meaning the viewer's objective) when viewing video assets associated with an incident, either in a real-time or in a forensic role, is also well dictated by standard operating procedure; and a set of video compression parameters can therefore be defined for a range of video viewer missions: e.g. routine surveillance to positive identification. Accordingly, in one illustrative implementation, CAD incident type and status is mapped to video viewer mission, which in turn is mapped to sets of video compression parameters. This mapping can be implemented by way of a pre-defined table accessible to the function 116.

An example of such a mapping table 300 is illustrated in FIG. 3. Table 300, shows columns for various illustrative viewer environmental conditions 302 indicated by a signal 122 from a viewer environment detection function including vehicle movement status (306), as determined by a GPS sensor, assigned incident type (308) and status (310) for that incident type. In this example, for a given viewer, their movement status and CAD assignment type and current status will dictate, map to, or identify a corresponding video compression parameter set 304 to be employed when streaming associated video assets (inclusive of in-vehicle cameras, nearby fixed surveillance cameras, etc) to the viewer. The mapped video compression parameters 304 shown in table 300 are bit rate (column 312), resolution (column 314) and frame rate (column 316). However, any combination of viewer environmental conditions and video compression parameters can be included in the table based on the inputs available to the viewer environment detection function and the type of encoding function 108. It should be noted that additional levels of indirection or mapping are possible. Although not depicted in FIG. 3, environmental conditions may map to a set of "video missions" which in turn map to a set of video compression parameters.

Continuing with the above example, when an unassigned officer, who is monitoring certain video assets as part of routine procedure, is driving, as signaled from a GPS function and indicated 122 to the policy enforcement system 104, the required video compression parameters selected may result in a low decoded video quality appropriately limited to the amount of detail which may be reasonably observed while the vehicle is in motion. When the officer later stops moving, as signaled from a GPS function and indicated 122 to the policy enforcement system 104, the video quality associated with relevant encoded video assets may be elevated, dependent upon how the change in GPS status maps to associated video compression parameters 120 sent to the video encoding function 108. This elevation in quality may entail changing the bit rate, changing the frame rate, changing the resolution, or any other means of affecting the decoded video quality. Similarly, when an officer assigned to a building fire arrives (indicated by a change in CAD status from 'en route' to 'arrived'), the video quality associated with relevant encoded video assets (e.g. nearby fixed surveillance cameras) may be elevated from low to high using the disclosed teachings.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. For example, the method steps described herein and illustrated within the drawings do not necessarily require the order shown unless explicated stated herein. As such, the steps described may be taken out of sequence and come steps may be performed simultaneously and still fall within the scope of the teachings and the claims herein. In addition, benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for adjusting video compression parameters for encoding source video based on a viewer's environment described herein. The non-processor circuits may include, but are not limited to, a radio receiver, a radio transmitter, signal drivers, clock circuits, power source circuits, and user input devices. As such, these functions may be interpreted as steps of a method for adjusting video compression parameters for encoding source video based on a viewer's environment described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for adjusting video compression parameters for encoding source video based on a viewer's environment, the method comprising:
   a policy enforcement device performing:
   receiving, from a video receiving device, a video stream identifier indicating a video stream and a source of the video stream, wherein the video receiving device is remote from the source of the video stream;
   receiving an indication of a computer aided dispatch (CAD) disposition of a viewer of the video stream using the video receiving device, wherein the video receiving device is remote from the source of the video stream;
   determining a set of video compression parameters based on the indication of the CAD disposition of the viewer;
   sending the set of video compression parameters to the identified source of the video stream to enable encoding of the video stream to a different compression level, causing the source of the video stream to transmit the video stream at the compression level based on the CAD disposition of the remote receiving device.

2. The method of claim 1, wherein video compression parameters comprises at least one of spatial resolution, frame rate, spatial compression, or bit rate.

3. The method of claim 1, wherein the indication of the CAD disposition of the viewer identifies an incident type associated with the viewer.

4. The method of claim 3, wherein the indication of the CAD disposition of the viewer identifies a current status for the incident type.

5. The method of claim 4, wherein changes in status for the incident type are tracked by a Computer Aided Dispatch application.

6. The method of claim 3, wherein the indication of the CAD disposition of the viewer identifies a change in state of a Computer Aided Dispatch record generated for an incident associated with the viewer.

7. The method of claim 1, wherein the indication of the CAD disposition of the viewer corresponds to a mission of the viewer.

8. The method of claim 7, wherein the indication of the CAD disposition of the viewer identifies an incident type and incident status, which identifies a mission of the viewer.

9. The method of claim 1, wherein the indication of the CAD disposition of the viewer identifies a location status.

10. The method of claim 1, wherein the indication of the CAD disposition of the viewer identifies a status of a condition associated with a vehicle of the viewer.

11. A policy enforcement device for adjusting video compression parameters for encoding source video based on a viewer's environment, the policy enforcement device comprising:
    an interface and a processing device that are operably coupled to:
    receive, from a video receiving device, a video stream identifier indicating a video stream and a source of the video stream, wherein the video receiving device is remote from the source of the video stream;
    receive an indication of a computer aided dispatch (CAD) disposition of a viewer of the video stream using the video receiving device;
    determine a set of video compression parameters based on the indication of the CAD disposition on of the viewer;
    send the set of video compression parameters to the identified source of the video stream to enable encoding of the video stream to a different compression level.

12. A non-transitory computer-readable storage medium having computer readable code stored thereon for programming a computer to perform a method for encoding source video based on a viewer's environment, the method comprising:
    receiving, from a video receiving device, a video stream identifier indicating a video stream and a source of the video stream, wherein the video receiving device is remote from the source of the video stream;
    receiving an indication of a computer aided dispatch (CAD) disposition of a viewer of the video stream using the video receiving device;
    determining a set of video compression parameters based on the indication of the CAD disposition of the viewer;
    sending the set of video compression parameters to the identified source of the video stream to enable encoding of the video stream to a different compression level.

* * * * *

UNITED STATES PATENT AND TRADEMARK OFFICE
CERTIFICATE OF CORRECTION

PATENT NO. : 8,743,953 B2  
APPLICATION NO. : 12/910728  
DATED : June 3, 2014  
INVENTOR(S) : Tyrone D. Bekiares et al.

Page 1 of 1

It is certified that error appears in the above-identified patent and that said Letters Patent is hereby corrected as shown below:

IN THE SPECIFICATION:

In Column 4, Line 20, delete "Aider" and insert -- Aided --, therefor.

IN THE CLAIMS:

In Column 10, Line 45, in Claim 11, delete "on of the" and insert -- one of the --, therefor.

Signed and Sealed this
Tenth Day of May, 2016

Michelle K. Lee
*Director of the United States Patent and Trademark Office*